United States Patent [19]

Asher

[11] 3,714,658
[45] Jan. 30, 1973

[54] ANALOG BEARING MEASURING SYSTEM

[75] Inventor: Ralph L. Asher, Old Tappan, N.J.

[73] Assignee: International Telephone and Telegraph Corporation, Nutley, N.J.

[22] Filed: Aug. 14, 1970

[21] Appl. No.: 63,794

[52] U.S. Cl. .............................. 343/106 R, 324/83 R
[51] Int. Cl. ............................................... G01s 1/46
[58] Field of Search ...................... 343/106 R; 324/83

[56] References Cited

UNITED STATES PATENTS 3,474,449   10/1969   Briggs ............................. 343/106 R Primary Examiner—Benjamin A. Borchelt
Assistant Examiner—Richard E. Berger
Attorney—Cornell C. Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The system described is a closed loop analog system which determines its bearing to a Tacan beacon. The beacon transmits a complex signal including pulse pairs amplitude modulated by fundamental and harmonic waves and spaced main and auxiliary reference pulse groups. The bearing is determined by phase locking two voltage controlled oscillators to the main reference pulse group to provide two reference signals, one having a frequency equal to the frequency of the fundamental wave and the other having a frequency equal to the frequency of the harmonic wave. These reference signals are then correlated with the fundamental and harmonic waves of the complex signal with the resultant phase error signals controlling a motor which is mechanically coupled to phase shift elements to control the phase of the reference signals. A synchro is also coupled mechanically to the motor to provide the bearing when the phase error signals are reduced to zero.

10 Claims, 4 Drawing Figures

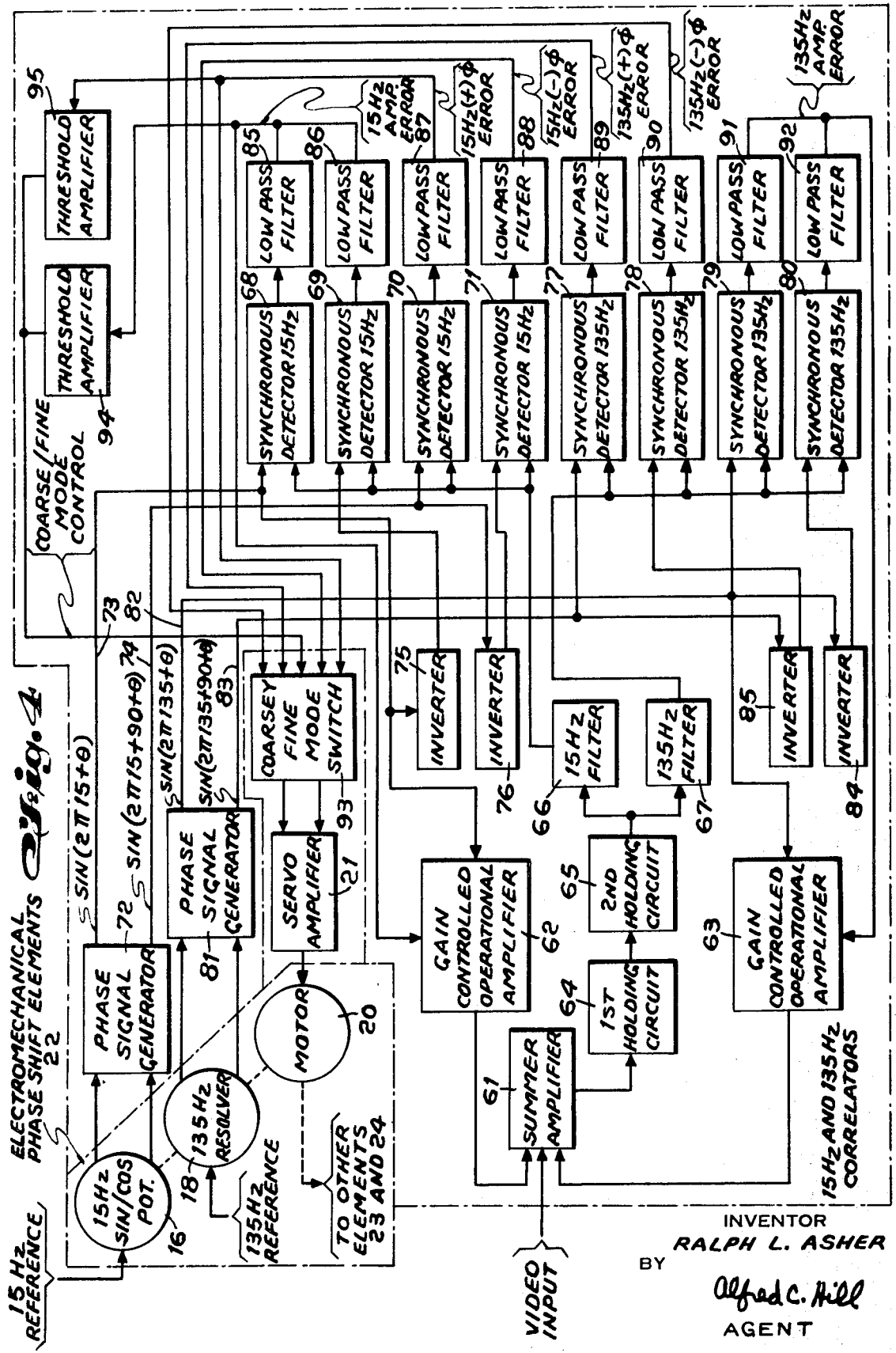

3,714,658

ANALOG BEARING MEASURING SYSTEM

BACKGROUND OF THE INVENTION

This invention relates to aerial navigation bearing systems and more particularly to an analog bearing measuring system.

In certain aerial navigation systems, such as Tacan, described in Volume 33, March 1956, of "Electrical Communication", the technical journal of the International Telephone & Telegraph Corp., azimuthal information is given by the relative phase between reference signals and a multi-lobed rotating antenna pattern which phase varies at different azimuthal positions with respect to the beacon. The beacon transmits several different types of pulse signals, such as pulse pairs, which the airborne radio set translates into bearing and distance information. The transmitting antenna system in the beacon produces multi-lobed directional patterns rotating at about 15 hertz (Hz). To a receiver receiving the pulse signals from the transmitter, the rotation of the antenna pattern produces an amplitude modulation envelope on these pulses. When the major lobe of the directional pattern points in a given direction, such as north, a main reference signal in the form of a short burst of pulses, for instance, pairs of pulses having a first distinct spacing therebetween different than the spacing of the majority of pulse pairs transmitted by the antenna, is transmitted from the beacon which signal is referred to as the "north or main reference signal". By comparing the phase of the modulation envelope, due to rotation of the beacon pattern, with that of the main reference signal, an indication of the bearing of the receiver with respect to the beacon is obtained. If only the main reference signal and a single-lobed directional pattern were employed, only a relatively coarse indication of bearing would be obtainable. To obtain a finer indication, the directional pattern is multi-lobed with each lobe separated, for example, by 40° from the adjacent lobes, and with auxiliary reference signals in the form of short bursts of pulses being emitted each time one of these lobes passes the predetermined reference point (for example, the north) as the antenna pattern is rotated. The auxiliary reference signal may be pairs of pulses having a second distinct spacing therebetween different than the first distinct spacing and the spacing between the majority of pulse pairs transmitted by the beacon. The rotation of this pattern produces a modulation envelope of 135 Hz (9 lobes multiplied by 15 Hz) on top of the fundamental wave of 15 Hz due to the main directive lobe. By comparing the phase of the 135 Hz modulation envelope with respect to the auxiliary reference signal, a fine azimuthal indication is obtained.

Heretofore, prior art Tacan systems made use of primarily analog techniques to measure bearing and detection of the received modulation envelopes was accomplished by employing peak riding circuitry and audio filtering. These circuits have, in the past, been employed in a wide variety of aircraft, but has been a major source of bearing error. Furthermore, the use of these prior art analog techniques subject the equipment to noise and jamming which are usually random in nature.

To overcome the above-mentioned disadvantages of the previous prior art analog techniques for bearing measurement there has been developed a digital bearing measuring system of the closed loop correlation type such as described in U.S. Pat. No. 3,349,401, issued to J.B. Kennedy and R.L. Asher. This digital system provides performance never before achieved. Accuracies were improved by an order of magnitude. Performance became largely independent of noise, variations in pulse repetition rates, harmonic components of the modulation envelope, signal bounce and flutter, and multi-path reflections. Furthermore, the problem of controlling phase shifts in the processing circuitry, which is common at these low frequencies, was avoided by utilizing a closed loop. The digital circuitry was additionally free from adjustments, thus, simplifying production and field maintenance.

While the above-mentioned digital bearing measuring system provided many important advantages, the system was complex and costly.

SUMMARY OF THE INVENTION

An object of the present invention is to provide a bearing measuring system achieving many of the performance advantages of the prior art digital bearing measuring system having greatly reduced costs and complexity.

Another object of the present invention is to provide an analog bearing measuring system which has improved performance capability with respect to the above-mentioned prior art analog bearing measuring system.

Still another object of this invention is to provide an analog bearing measuring system retaining the performance advantages of the prior art digital measuring system yet having reduced cost and complexity.

A feature of the present invention is the provision of a bearing measuring system disposed at a first location to determine the bearing of the first location from a beacon disposed at a second location spaced from the first location, the beacon emitting a complex signal including a fundamental wave, a harmonic wave and spaced main and auxiliary reference signals having predetermined repetition frequency equal to the frequency of the fundamental and harmonic waves, respectively, comprising a source of the complex signal; first means coupled to the source to produce a first signal having a frequency equal to the frequency of the fundamental wave and a second signal having a frequency equal to the frequency of the harmonic wave, the first and second signals being phase locked to the main reference signal; and second means coupled to the source and the first means responsive to the first and second signals and the complex signal to provide the bearing.

BRIEF DESCRIPTION OF THE DRAWING

The above-mentioned and other features and objects of this invention will become more apparent by reference to the following description taken in conjunction with the accompanying drawings, in which:

FIG. 4 is a detailed block diagram of the 15 Hz and 135 Hz correlators of FIG. 1.

DESCRIPTION OF THE PREFERRED EMBODIMENT

Figure 1:
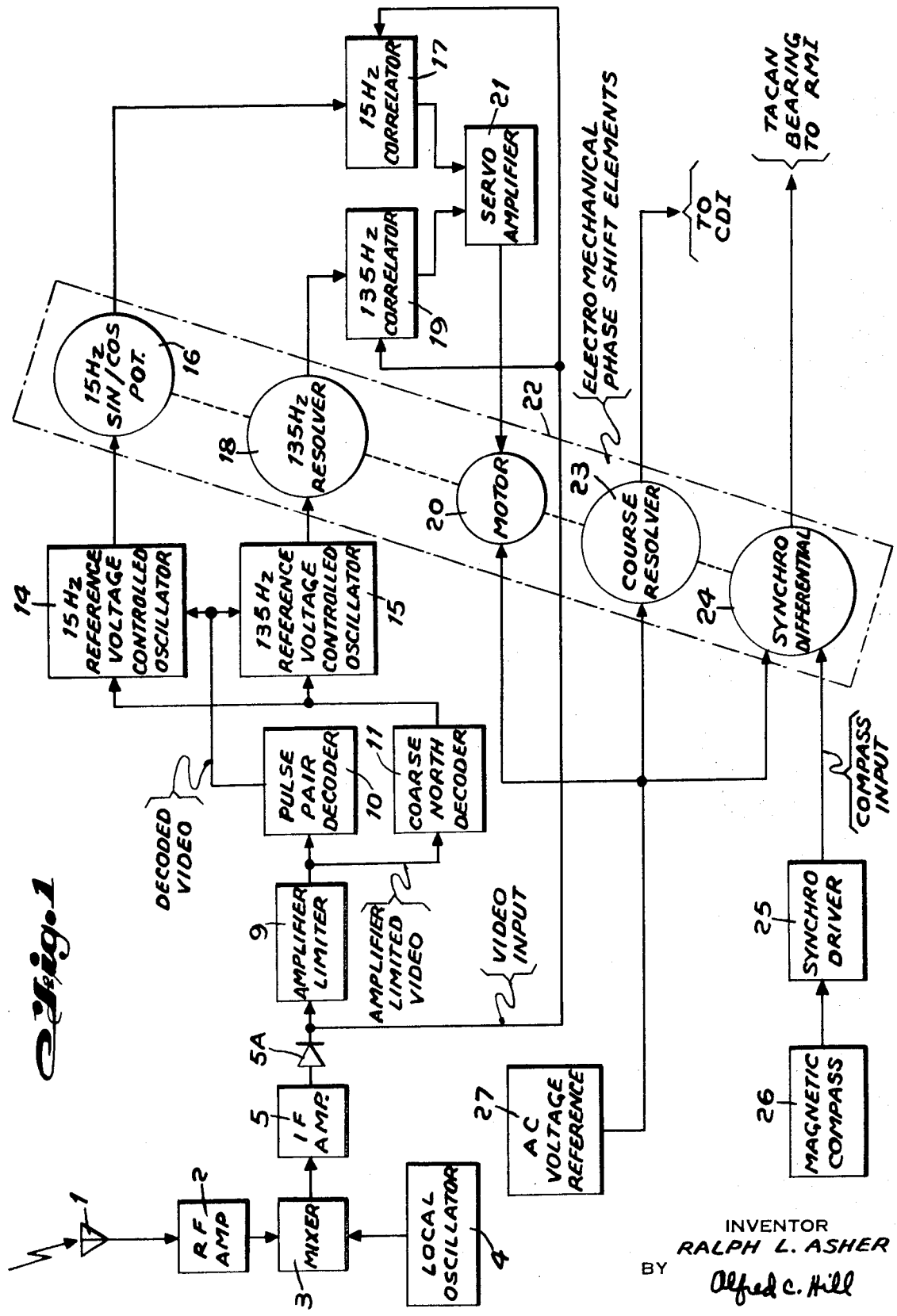
FIG. 1 is a general block diagram of the analog bearing measuring system in accordance with the principles of the present invention.

Referring to FIG. 1, there is disclosed therein, in general block diagram form, the analog closed loop bearing measuring system in accordance with the principles of the present invention. It is the purpose of this system to determine its bearing with respect to a beacon, such as a Tacan beacon, which transmits a complex signal in the form of pulse pairs having a first distinctive spacing which are amplitude modulated by the beacon antenna rotation to provide fundamental (15 Hz) and harmonic (135 Hz) waves. Upon occurrence of a reference point, such as north, main reference pulses having a second distinctive spacing is generated and transmitted as part of the complex signal. The second distinctive spacing of the main reference pulses is different than the spacing of the first distinct spacing. Additionally, for a fine bearing indication auxiliary reference signals in the form of pulses having a third distinctive spacing are generated every time the antenna pattern passes the predetermined reference point (north). The third distinct pulse spacing is different than the first and second distinctive spacing of the other pulses forming components of the transmitted complex signal.

Figure 2:
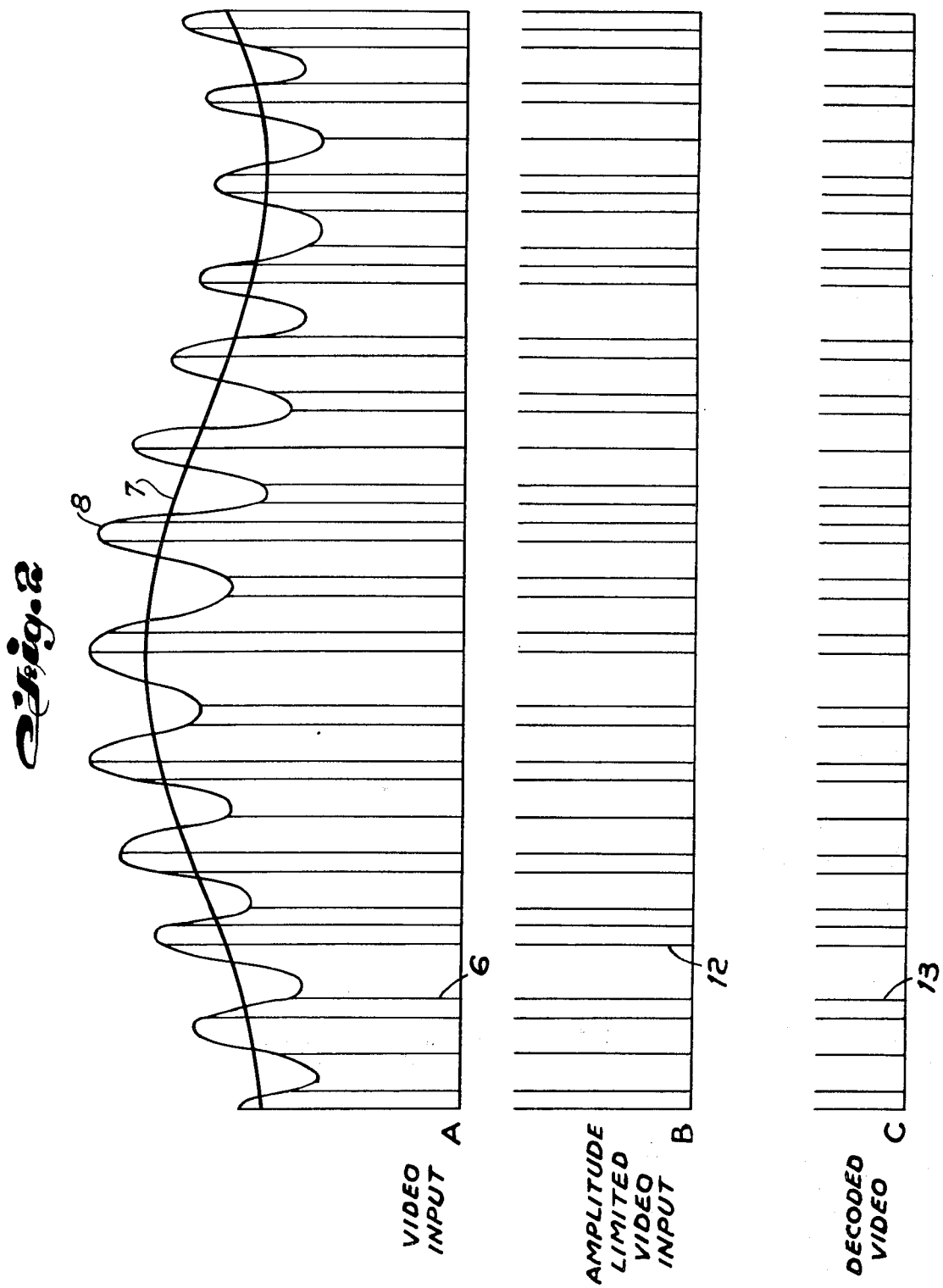
FIG. 2 is a series of waveforms present at various locations in FIGS. 1, 3 and 4.

The above described complex signal is received on antenna 1 from a beacon, such as a Tacan beacon, (not shown). The received signal is amplified in radio frequency (RF) amplifier 2 and then heterodyned to an intermediate frequency (IF) level through the cooperation of mixer 3 and local oscillator 4. The resultant IF signal is amplified in IF amplifier 5 and detected in detector 5A at which point there is present the received complex signal identified as the "video input" which has a waveform as illustrated in Curve A, FIG. 2. The vertical lines 6 of Curve A, FIG. 2, represent pulse pairs, certain of which have the above-mentioned first distinctive spacing, others of which have the above-mentioned second distinctive spacing and still others of which have the above-mentioned third distinctive spacing. These pulse pairs due to the rotation of the Tacan beacon antenna are amplitude modulated to provide a 15 Hz fundamental wave as shown by line 7 and a 135 Hz harmonic wave as shown by curve 8.

The output of detector 5A is amplitude limited in amplitude limiter 9 to provide an amplitude limited video signal, as illustrated in Curve B, FIG. 2, for coupling to the pulse pair decoder 10 and coarse north decoder 11. In Curve B FIG. 2 the constant amplitude pulse pairs are represented by vertical lines 12. In other words, the fundamental and harmonic wave components of Curve A, FIG. 2 have been removed by limiter 9. Decoder 10 operates upon the pulse pairs of the waveform of Curve B, FIG. 2 to produce a decoded video signal as illustrated in Curve C, FIG 2 wherein the vertical lines 13 now represent a single constant amplitude pulse indicative of the presence of a pulse pair. Decoder 10 may be in the form of an appropriately tapped delay line coupled to logic circuitry to detect the pulse pairs of the amplitude limited video signal having the first, second and third distinctive spacing.

Decoder 11 functions to detect solely the position of the main or north reference pulse train having the second distinctive spacing within several degrees. Decoder 11 may be in the form of a delay line having spaced taps corresponding to the second distinctive pulse spacing together with logic circuitry that will produce a single pulse output every time the main reference pulse pair is detected by decoder 11. Decoder 11 provides a great deal of discrimination against noise and other synchronous information such as auxiliary reference pulse pairs.

Figure 3:
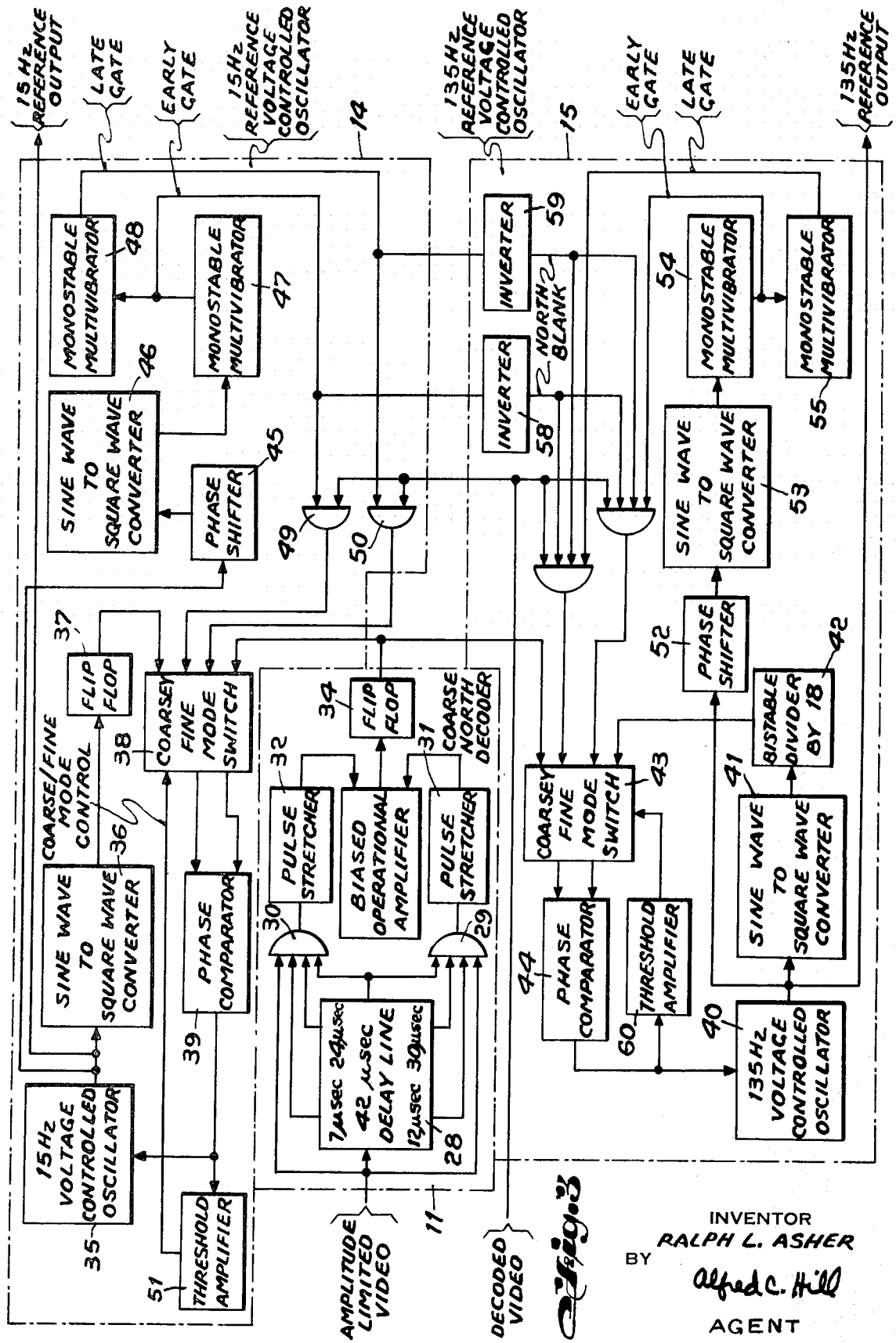
FIG. 3 is a more detailed block diagram of the 15 Hz and 135 Hz voltage controlled oscillator and the coarse north decoder of FIG. 1.

A 15 Hz and a 135Hz reference signal are produced by voltage controlled oscillators 14 and 15 having applied to their inputs the decoded video from decoder 10 and the decoded main reference pulse pair from decoder 11. Voltage controlled oscillators 14 and 15, which will be more fully described hereinbelow with respect to FIG. 3, are phase locked to the main reference signal at the output of decoder 11. Thus, the output of decoder 11 is used to phase lock oscillators 14 and 15 to the main reference signal with a more precise phase lock being provided by the decoded video signal from decoder 10 which is correlated against the output of oscillators 14 and 15.

The 15 Hz signal output of oscillator 14 provides a sinewave which is now accurately locked to the received main reference signal which is phase shifted in a conventional sine/cosine potentiometer 16 and becomes one input to the 15 Hz correlator 17. In a like manner, the 135 Hz reference sine wave from oscillator 15 is phase shifted by resolver 18 prior to coupling to the 135 Hz correlator 19. The other input to correlators 17 and 19 is provided by the video input from detector 5A.

The error voltage developed by correlator 17 is used to excite motor 20 through servo amplifier 21. Motor 20 is the driving element of the electromechanical phase shift elements 22 which includes potentiometer 16 and resolver 18 mechanically linked to motor 20. In an arrangement not illustrated in FIG. 1, but which is illustrated in FIG. 4 and fully described with respect thereto, servo amplifier 21 is switched to the output of correlator 19 when the error voltage from correlator 17 has reached a predetermined null point. Thus, the error voltage from correlator 19 now controls motor 20 through servo amplifier 21 to provide a fine control of the shaft position of motor 20. As long as error voltage remains at the output of correlator 19, motor 20 will have driving voltage. Motor 20 and all of the components mechanically linked to it including potentiometer 16, resolver 18, course resolver 23 and synchro differential 24 will rotate until no error voltage appears at the output of correlator 19. At this point, the phase of the phase shifted 15 Hz and 135Hz sine waves will be coincident with the received video input at correlators 17 and 19. Since the synchro differential 24 and the course resolver 23 are located on the same shaft as the motor, their outputs are taken directly to the radio magnetic indicator (RMI) and the course deviation indicator (CDI) for presentation of the Tacan bearing and course selected difference.

To obtain the true bearing of the aircraft containing the equipment of FIG. 1 with respect to the Tacan beacon, synchro differential 24 has a compass input coupled thereto as provided by synchro driver 25 which is coupled to magnetic compass 26. The compass input compensates for the magnetic heading of the aircraft and thereby provides true bearing of the aircraft with respect to the Tacan beacon.

To provide a reference phase for motor 20, resolver 23 and synchro differential 24, an alternating current (AC) voltage reference is provided by source 27.

Referring to FIG. 3, there is disclosed therein a more detailed block diagram of oscillators 14 and 15 and decoder 11. In order to pull the north or main reference pulse pair out of a noisy received signal, the ratio of the spacing of the main reference pulse pair and some other randomly selected spacing between pulses of a pair must be high. In order to suppress the auxiliary reference pulse pair from being decoded as a main reference burst, the random spacing must be set up to correspond to the spacing of that of the auxiliary reference pulse pair. To accomplish this, decoder 11 includes a 42 microsecond ($\mu$s) delay line 28 with taps spaced at 12 and 30 $\mu$s for decoding of the main reference pulse pair and with taps spaced at 7 and 24 $\mu$s for decoding of random pulse pairs. The 12 and 30 $\mu$s taps of delay line 28 are coupled to AND gate 29 together with the input and output of delay line 28 and the 7 and 24 $\mu$s taps of delay line 28 are coupled to AND gate 30 together with the input and output of delay line 28. The output of AND gate 29 is coupled to pulse stretcher 31 and the output of AND 30 is coupled is pulse stretcher 32 each of which have several hundred us time constants. The ratio between the output of pulse stretchers 31 and 32 is determined in biased operational amplifier 33. When the ratio of the output of pulse stretchers 31 and 32 exceed the threshold as established by the bias of amplifier 33, a pulse will appear at its output. With a Tacan signal being received, there will be 15 of these pulses at the output of amplifier 33 each second positioned at approximately the time that a main reference pulse pair is received. In order to phase lock oscillators 14 and 15 to this signal the pulse at the output of amplifier 33 are used to trigger a bistable multivibrator, such as flip flop 34, to divide the output signal of amplifier 33 by a factor of two thereby providing a 7.5 Hz square wave at the output of flip flop 34.

Consider first how oscillator 14 is phase locked to the output of decoder 11. Oscillator 14 includes a 15 Hz voltage controlled oscillator 35 whose sine wave output is converted to a square wave in sine wave-to-square wave converter 36 in the form of a saturated operational amplifier. The output signal of converter 36 is divided by a factor of two in flip flop 37 to provide a 7.5 Hz square wave at the output thereof. Through the means of coarse/fine mode switch 38, the output signal from flip flop 37 and the output signal from flip flop 34 is coupled to phase comparator 39 which provides a well filtered direct current (DC) voltage to control the frequency and phase of oscillator 35 to be locked to the output of de-coder 11, or in other words, to the main reference pulses.

In a like manner the 135 Hz reference output of oscillator 15 is locked to the output of decoder 11. Oscillator 15 includes a 135 Hz voltage controlled oscillator 40 whose sine wave output is converted to a square wave output in sine wave-to-square wave converter 41 in the form of a saturated operational amplifier. The output signal from converter 41 is divided by a factor of eighteen in a bistable multivibrator divider 42 in the form of a chain of flip flops with appropriate feedbacks to provide a 7.5 Hz output signal for coupling through mode switch 43 together with the 7.5 Hz output signal of flip flop 34 to phase comparator 44 which provides a well filtered DC control voltage for oscillator 40 to control the frequency and phase of the output signal thereof to be locked to the main reference signal.

For more precise control of oscillator 35, the distribution of the main reference pulses within early and late gates derived from oscillator 35 is employed to determine the phase and frequency of the output signal of oscillator 35. To accomplish this, the output signal of oscillator 35 is phase shifted in phase shifter 45 slightly to a position corresponding to the beginning of the early gate. The phase shifted signal output of shifter 45 is converted to a square wave in sine wave-to-square wave converter 46 in the form of a saturated operational amplifier. The output signal of converter 46 triggers monostable multivibrator 47 to produce the early gate. The early gate from multivibrator 47, in turn, triggers monostable multivibrator 48 to produce the late gate. The outputs of multivibrators 47 and 48 are fed to AND gates 49 and 50 whose other input is the decoded video signal from decoder 10 of FIG. 1. The output signals of AND gates 49 and 50 are pulses representing the correlated signal between the received main reference signal and the phase of the output signal of oscillator 35. These signals are applied through the fine mode section of mode switch 38 to phase comparator 39 which produces a DC voltage which is employed to tune oscillator 35 to be more finely locked to the main reference signal.

Switch 38 is controlled to switch from its coarse mode section to its fine mode section when the output voltage of comparator 39 produced by the comparison of the signals present at the output of flip flops 34 and 37 reaches a predetermined null point as detected by threshold amplifier 51. When the threshold of amplifier 51 is exceeded, a control signal is generated to switch switch 38 from its coarse mode to its fine mode so that the outputs from AND gates 49 and 50 can be compared to the output of flip flop 37.

In an identical fashion, oscillator 40 will receive a more precise control by generating early and late pulses in the circuitry including phase shifter 52, converter 53, monostable multivibrator 54 and monostable multivibrator 55 functioning as described hereinabove with respect to phase shifter 45, converter 46 and multivibrators 47 and 48. The outputs from multivibrators 54 and 55 are coupled to AND gates 56 and 57 which has a second input from the decoded video output of decoder 10 (FIG. 1) and a third input from inverters 58 and 59 coupled to the output of multivibrators 47 and 48, respectively, so that AND gates 56 and 57 are disabled during the early and late gate pulses corresponding to the correlation of the received main reference signal and the output signal of oscillator 35.

The outputs of AND gates 56 and 57 are pulses representing the correlation between the received auxiliary reference pulses and the phase of the output signal of oscillator 40 and are applied through mode switch 43 which is operating in its fine mode position. Mode switch 43 is identical in function to mode switch 38 and is switched from its coarse to fine mode portion as was switch 38 when the output of phase comparator 44 provides a null which exceeds the threshold level of threshold amplifier 60 with switch 43 in its coarse mode operation. An output from threshold amplifier 60 causes switch 43 to switch from its coarse mode portion to its fine mode portion.

Referring to FIG. 4, there is disclosed therein a more detailed diagram of correlators 17 and 19 of FIG. 1. In this circuit arrangement, closed loop correlation between the video input from amplifier 5 (FIG. 1) and the 15 Hz and 135 Hz reference signals of oscillators 14 and 15 (FIGS. 1 and 2) is employed. Operation takes place by striving to obtain no 15 Hz or 135 Hz components at the output of summer amplifier 61. This will be accomplished when the 15 Hz and 135 Hz feedback signals are equal and opposite to the 15 Hz and 135 Hz components in the received video signal. The phase of these feedback signals will be adjusted by operating motor 20 and, hence, potentiometer 16 and resolver 18 such that their output signals are 180° phase different from the respective components in the video input signal. The amplitude of the feedback signals is controlled by varying the control input of gain controlled operational amplifiers 62 and 63.

When the system is at null, the output of summer 61 will have no 15 Hz or 135 Hz components. Any components which are present at this point will represent the 15 Hz and 135 Hz error components. The output of summer 61 is sent to a first holding circuit 64. This circuit permits the bearing measurement to operate from the first pulse of the transmitted Tacan pulse pairs. It operates by holding the peak amplitude of any pulse received for a period long enough to confirm whether it is a first pulse of a received pair. If this confirmation is received in the form of an output, the output of the first holding circuit 64 is sent to the second holding circuit 65. If confirmation is not received, the first holding circuit 64 is reset and operation continues. If first pulse operation is not required, circuit 64 can be eliminated.

Holding circuit 65 is a box car decoder which, in a closed loop, will provide long term peak detection of the resultant error signal. The error components are separated by two bandpass filters 66 and 67 into 15 Hz and 135 Hz components. The output from filter 66 is coupled to synchronous detectors 68–71 and the output from filter 67 is coupled to synchronous de-tectors 77–80.

The output from potentiometer 16 is coupled to phase signal generator 72 which generates an output signal $\sin(2\pi 15 + \theta)$ on conductor 73 and an output signal $\sin(2\pi 15 + 90 + \theta)$ on conductor 74. The output signal on conductor 73 is coupled to detector 68 and also to amplifier 62. A complemented version of the output signal on conductor 73, provided by inverter 75, is coupled to detector 69. The output signal on conductor 74 is coupled to detector 70 while a complemented version thereof, provided by inverter 76, is coupled to detector 71.

Phase signal generator 81 receives its input signal from resolver 18 and produces on conductor 82 the output signal $\sin(2\pi 135 + \theta)$ and on conductor 83 the output signal $\sin(2\pi 135 + 90 + \theta)$. The signal on conductor 82 is coupled to detector 79 and the input of amplifier 63. A complemented version of the signal on conductor 82, provided by inverter 84, is coupled to detector 80. The signal on conductor 83 is coupled to detector 77 and a complemented version thereof, provided by inverter 85 is coupled to detector 78.

Detectors 68–71 and 77–80 are, in effect, linear switches which will be turned on and off by the voltages and their complements generated in generators 72 and 81, respectively.

The $\theta$ present in the above equations for the signals at the output of generators 72 and 81 represents the phase shift imparted to the 15 Hz reference signal by potentiometer 16 and also the phase shift imparted to the 135 Hz reference signal by resolver 18.

The output signals of each of detectors 68–71 and 77–80 are integrated in low pass filters 85–92 to form DC voltages proportional to the phase and amplitude errors of the 15 Hz and 135 Hz signals. The amplitude error for the 15 Hz component is present at the output of filters 85 and 86 and is coupled as the gain control signal to amplifier 62. The phase error signals of the 15 Hz component are provided by filters 87 and 88 and are coupled to coarse/fine mode switch 93. At this point in the operation switch 93 will be in its coarse position and the signals from filters 87 and 88 will activate servo amplifier 21, which in turn, controls motor 20.

The amplitude error of the 135 Hz component is produced at the outputs of filters 91 and 92 and is used as a gain control signal for amplifier 63. The phase error control signals for the 135 Hz component is provided at the outputs of filters 89 and 90 which are coupled to mode switch 93 and will be employed to drive servo amplifier 21 when switch 93 is in its fine mode position. Switch 93 is switched from its coarse to fine mode operation or position through the cooperation of threshold amplifier 94 which detects when the amplitude error signal achieves a null which exceeds a predetermined threshold level and amplifier 95 which detects when the phase error signal at the output of filters 87 has achieved a null which exceeds a predetermined threshold level. When both of amplifiers 94 and 95 produces an output, switch 93 is switched to its fine mode operation or position to permit the phase error signals of the 135 Hz component to drive servo amplifier 21 and, hence, motor 20.

Correlation of the input voltages from filters 66 and 67 with the inphase phase shifted reference signals from generators 72 and 81 produces DC voltages proportional to amplitude error while correlation with the quadrature signals present at the output of generator 72 and 81 produces DC voltages proportional to phase error.

The amplitude error voltage from filters 85 and 86 control the gain of amplifier 62 and the amplitude error voltage from filters 91 and 92 controls the gain of amplifiers 63. The phase error voltages are used to control motor 20 after amplification by servo amplifier 21. This system will cause the motor to turn or the gain of the amplifiers 62 and 63 to be varied until no net 15 Hz and 135 Hz components remain at the output of summer 61. At this point, the bearing measuring system will be at a null, and the position of the shaft controlled by motor 20 will correspond to the received Tacan bearing.

The description of the system hereinabove has a cost which is roughly in line with the cost of a semiconductor version of the prior art analog bearing measuring system and will provide many of the improved performance features described hereinabove under the heading "Background of the Invention" with respect to the digital measuring system of the prior art. In addition, the system of this invention offers an additional advantage of being able to measure air-to-air bearing or inverse mode bearing with no modification or cost penalty. While the complete system was described hereinabove, several simplications are possible. These include elimination of the fine correlation loops in phase locking the reference signals to the main reference signals, deletion of first pulse amplitude sampling as provided by holding circuit 64 (FIG. 4) and the elimination of the fine (135 Hz) bearing measuring circuits of FIG. 4.

It should be noted that while the above description is related to the measurement of Tacan bearing the technique can be employed in any phase measurement between a variable and reference component. In navigation systems, it will be applicable to Very High Frequency Omnidirectional Radio Range (VOR).

While I have described above the principles of my invention in connection with specific apparatus, it is to be clearly understood that this description is made only by way of example and not as a limitation to the scope of my invention as set forth in the objects thereof, and in the accompanying claims.

I claim:

1. A bearing measuring system disposed at a first location to determine the bearing of said first location from a beacon disposed at a second location spaced from said first location, said beacon emitting a complex signal including a fundamental wave, a harmonic wave and spaced main and auxiliary reference signals having predetermined repetition frequencies equal to the frequencies of said fundamental and harmonic waves, respectively, comprising:

a receiver to receive from said beacon said complex signals;

first means coupled to said receiver to produce a first signal having a frequency equal to the frequency of said fundamental wave of said complex signal and a second signal having a frequency equal to the frequency of said harmonic wave of said complex signal, said first and second signals being phase locked to said main reference signal of said complex signal; and second means coupled to said receiver and said first means responsive to said first and second signals and said complex signal to provide said bearing.

2. A system according to claim 1, wherein
said second means includes
    first correlation means coupled to said receiver and said first means to correlate said first signal and said fundamental wave of said complex signal to produce a first phase error signal,
    second correlation means coupled to said receiver and said first means to correlate said second signal and said harmonic wave of said complex signal to produce a second phase error signal, and
    electromechanical means coupled to said first and second correlation means responsive to said first and second phase error signals to provide said bearing.

3. A system according to claim 1, wherein
said second means includes
    motor means,
    a first phase shift means mechanically linked to said motor means and coupled to said first means responsive to said first signal,
    a second phase shift means mechanically linked to said motor means and coupled to said first means responsive to said second signal,
    first correlation means coupled to said receiver and said first phase shift means to correlate said first signal and said fundamental wave of said complex signal to produce a first phase error signal,
    second correlation means coupled to said receiver and said second phase shift means to correlate said second signal and said harmonic wave of said complex signal to produce a second phase error signal,
    said motor means being coupled to said first and second correlation means, said motor means being controlled by said first and second phase error signals until both said first and second phase error signals equal zero, and
    third means coupled to said motor means to provide said bearing when both said first and second phase error signals equal zero.

4. A system according to claim 3, wherein
said first and second correlation means include
    fourth means coupled to said first phase shift means to provide said first signal and a 90° shifted version of said first signal,
    fifth means coupled to said second phase shift means to provide said second signal and a 90° shifted version of said second signal,
    summing means coupled to said receiver,
    first filter means coupled to said summing means to pass signals having a frequency equal to the frequency of said fundamental wave,
    second filter means coupled to said summing means to pass signals having a frequency equal to the frequency of said harmonic wave,
    a first correlator coupled to said first filter means and said fourth means responsive to said first signal,
    a second correlator coupled to said first filter means and said fourth means responsive to the complement of said first signal,
    a third correlator coupled to said first filter means and said fourth means responsive to said 90° shifted version of said first signal,
    a fourth correlator coupled to said first filter means and said fourth means responsive to the complement of said 90° shifted version of said first signal,
    a fifth correlator coupled to said second filter means and said fifth means responsive to said second signal,
    a sixth correlator coupled to said second filter means and said fifth means responsive to the complement of said second signal,
    a seventh correlator coupled to said second filter means and said fifth means responsive to said 90° shifted version of said second signal,
    an eighth correlator coupled to said second filter means and said fifth means responsive to the complement of said 90° shifted version of said second signal, a first amplifier coupled between said fourth means and said summing means having its gain controlled by the output signal of said first and second correlators, a second amplifier coupled between said fifth means and said summing means having its gain controlled by the output signal of said fifth and sixth correlators, and sixth means to couple the output signals of said third, fourth, seventh and eighth correlators to said motor means.

5. A system according to claim 4, wherein said sixth means includes a servo amplifier coupled to said motor means, a mode switch means coupled to said servo amplifier and said third, fourth, seventh and eighth correlators, and seventh means coupled to said switch means and said first, second and third correlators for control of said switch means to cause said motor means to be controlled by the output signals of said third and fourth correlators first and then by the output signal of said seventh and eighth correlators.

6. A system according to claim 1, wherein said first means includes third means coupled to said receiver to recover said main reference signal, a first voltage controlled oscillator to provide said first signal, a first phase comparator coupled to said third means and said first oscillator to phase lock said first signal to said main reference signal, a second voltage controlled oscillator to provide said second signal, fourth means coupled to said second oscillator to divide the frequency of said second signal to be equal to the frequency of said main reference signal, and a second phase comparator coupled to said third means, said fourth means and said second oscillator to phase lock said second signal to said main reference signal.

7. A system according to claim 6, wherein said complex signal includes pulse pairs amplitude modulated to provide said funda-mental and harmonic waves; and said first means further includes fifth means coupled to said receiver to decode said pulse pairs, first monostable means coupled to said first oscillator to produce a first early gate, second monostable means coupled to said first monostable means to produce a first late gate, first gated means coupled to said fifth means, said first and second monostable means and said first phase comparator to provide a more accurate phase lock of said first signal, third monostable means coupled to said second oscillator to produce a second early gate, fourth monostable means coupled to said third monostable means to produce a second late gate, second gated means coupled to said fifth means, said first, second, third and fourth monostable means and said second phase comparator to provide a more accurate phase lock of said second signal.

8. A system according to claim 1, wherein said first means includes third means coupled to said receiver to recover said main reference signal, a first voltage controlled oscillator to provide said first signal, a first phase comparator coupled to said third means and said first oscillator to phase lock said first signal to said main reference signal, a second voltage controlled oscillator to provide said second signal, fourth means coupled to said second oscillator to divide the frequency of said second signal to be equal to the frequency of said main reference signal, and a second phase comparator coupled to said third means, said fourth means and said second oscillator to phase lock said second signal to said main reference signal; and said second means includes first correlation means coupled to said receiver and said first oscillator to correlate said first signal and said fundamental wave of said complex signal to produce a first phase error signal, second correlation means coupled to said receiver and said second oscillator to correlate said second signal and said harmonic wave of said complex signal to produce a second phase error signal, and electromechanical means coupled to said first and second correlation means responsive to said first and second phase error signals to provide said bearing.

9. A system according to claim 8, wherein said complex signal includes pulse pairs amplitude modulated to provide said fundamental and harmonic waves; and said first means further includes fifth means coupled to said receiver to decode said pulse pairs, first monostable means coupled to said first oscillator to produce a first early gate, second monostable means coupled to said first monostable means to produce a first late gate, first gated means coupled to said fifth means, said first and second monostable means and said first phase comparator to provide a more accurate phase lock of said first signal, third monostable means coupled to said second oscillator to produce a second early gate, fourth monostable means coupled to said third monostable means to produce a second late gate, second gated means coupled to said fifth means, said first, second, third and fourth monostable means and said second phase comparator to provide a more accurate phase lock of said second signal.

10. A system according to claim 9, wherein said electromechanical means includes a motor means, a sin/cos potentiometer, mechanically coupled to said motor means and coupled to said first oscillator,
a resolver mechanically coupled to said motor means and coupled to said second oscillator,
a magnetic compass servo input,
a synchro differential coupled to said compass input and mechanically coupled to said motor means,
said motor means being coupled to said first and second correlation means and controlled by said first and second phase error signals,
said synchro differential providing said bearing when both said first and second phase error signals equal zero.

* * * * *